United States Patent

O'Neil

[11] 4,095,699
[45] Jun. 20, 1978

[54] PICK AND PLACE MACHINE

[75] Inventor: James P. O'Neil, Swansea, Mass.

[73] Assignee: Automation Designs Inc., Bristol, R.I.

[21] Appl. No.: 767,624

[22] Filed: Feb. 10, 1977

[51] Int. Cl.² .................................... B65G 47/90
[52] U.S. Cl. ............................ 214/1 BB; 198/486
[58] Field of Search .............. 214/1 BB, 1 BT, 1 B, 214/1 BS; 198/486; 74/110

[56] References Cited

U.S. PATENT DOCUMENTS

| | | | |
|---|---|---|---|
| 3,703,834 | 11/1972 | Beezer | 214/1 BB X |
| 3,865,253 | 2/1975 | Healy | 214/1 BT |
| 3,881,362 | 5/1975 | Beezer | 214/1 BB X |
| 3,988,938 | 11/1976 | Nagai | 214/1 BB X |
| 4,037,732 | 7/1977 | Orlando et al. | 214/1 BB |

FOREIGN PATENT DOCUMENTS 1,330,653  9/1973  United Kingdom ............. 214/1 BB

*Primary Examiner*—Frank E. Werner
*Attorney, Agent, or Firm*—Robert J. Doherty

[57] ABSTRACT

A pick and place machine operable to transfer a part from a loading station to a horizontally removed delivery station. Jaws for grasping and releasing the parts are mounted on the first of a pair of interrelated members, said first member being vertically slidable in relationship to the second member and both of said members horizontally slidable with respect to a supporting housing so as to accomplish part movement in an X-Y direction, i.e., an inverted U-shape path. The travel which such first member assumes is controlled by a follower attached thereto and in contact with a cam path defined within the housing and disposed adjacent the members. Motion imparted to the follower by a crank arm mounted for reciprocal motion as by an air cylinder or the like.

15 Claims, 7 Drawing Figures

PICK AND PLACE MACHINE

BACKGROUND OF THE INVENTION

This invention relates to a device capable of picking a part from a loading station and thereafter placing and releasing such part in a delivery station. Such devices are commonly referred to as "pick and place machines." More particularly the invention relates to a pick and place machine construction which is particularly straight forward in both operation and structural components so as not only be less expensive but also more reliable through its utilization of fewer and more easily replaceable parts should malfunction occur.

Mechanisms of this general type are known and normally include a pair of opposed part holding jaws in turn mounted on a carriage or supporting structure and adapted to shift between loading and delivery stations. The part holding jaws are adapted to move between closed and open positions to respectively grip and release a part and may be activated by several alternative mechanisms including differential fluid pressure, electrical or mechanical means so that when in such loading station the jaws assume an open posture to span the part, thereafter are closed to grasp the part whereupon the carriage or other moving device travels to the delivery station where the jaws serve to position and thereafter release the part for subsequent operations thereto. Machines of this nature are of general utility and may specifically serve to unload molding machines and move the products delivered therefrom to a packing station, reposition parts between intermediate processing steps, and similar functions normally required to be carried out by human activity.

Examples of devices of this general nature may be found in the following U.S. Pat. Nos: 3,655,070; 3,521,760; 3,803,944; 2,670,983; 3,507,403; 3,397,799; 3,865,253; 3,647,090; 3,910,423; 3,921,820; and 3,921,822.

SUMMARY OF THE INVENTION

Generally the object of the present invention is the provision of a new and modified construction of a pick and place machine to perform the general functions above indicated in a noncomplex manner utilizing straight forward, assured operation, simple, mechanical components, which are unlikely to fail during the millions of repetitive cycles contemplated with such devices, yet easily corrected as by replacement or repair should malfunction occur.

Another object of the present invention is the provision of a novel pick and place device of the above indicated character incorporating motion transmitting means controllable in generally horizontal and vertical directions by a follower which is guided along a predetermined cam path and which follow in turn imparts similar motion to the means which is respectively adapted for grasp and release of the parts to be transported.

A further object of the invention is the provision of a sequential activation of part handling means during different positions of the motion imparting means of the device as it moves along its predetermined X-Y direction path and additionally the provision of a novel means for adjusting the extent of such path so that the part handling mechanism may be varied in position with respect to the part in either or both of loading and delivery stations.

The above objects are accomplished by the provision of a pick and place machine having a housing, a first member supported by the housing for free horizontal reciprocal movement with respect thereto, a second member supported by said first member for free vertical reciprocal movement with respect thereto and guide means including a track having horizontal and vertical components and a follower disposed therein, said follower connected to said second member, and means for reciprocating said follower along said track, whereby vertical movement thereof actuates said second member in a vertical direction with respect to said first member; and horizontal movement thereof serves to simultaneously, horizontally move both said members between loading and delivery stations in turn at least horizontally spaced with respect to each other.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

SUMMARY OF THE INVENTION

Figure 1:
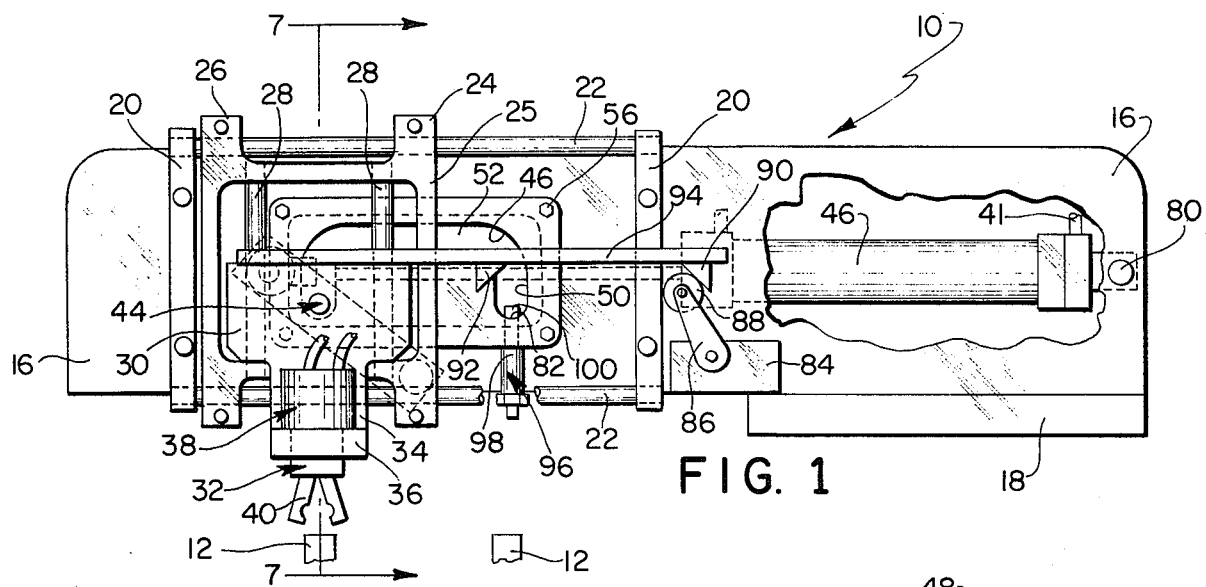
FIG. 1 is an elevational view of a pick and place machine embodying the novel structural features of the present invention as viewed from the working side thereof and disposed in its load position.

With reference to the drawings and particularly FIGS. 1 - 4, the pick and place device 10 of the present invention is shown in a mode disposed to move parts (not shown) from a loading station 12 indicated to the left, and a delivery station 14 indicated on the right. Any parts normally associated with such movement could be appropriately handled by modification of the size and shape of the various structural components comprising the device 10, and accordingly the parts and the precise manner in which they are conveyed between such stations forms no part of the present invention. Also the loading and delivery stations could obviously be interchanged.

The device 10 includes a main plate 16 positioned in a somewhat vertical attitude and supported by means of a base member 18 to its own support (not shown) or the support of a further machine with which the present device may be associated, it being clear that the present machine may be utilized either alone to perform pick and place functions, or in conjunction with other machines, especially should such function be an integral portion of the operation of such machines. It should also be clear that the present device need only be otherwise operatively positioned with respect to the loading and delivery stations 12, 14, so that the parts being respectively removed and placed thereby may be suitably accessible.

A pair of horizontally spaced supports 20 outwardly extend from the forward face of the main plate 16 and in turn serve to support a pair of vertically spaced shafts 22. These shafts 22 in turn support a horizontally slidable first member 24 depicted of generally H-shape configuration, and having a frame 25 and a plurality of pairs of ears 26 extending therefrom. The shafts are received within openings provided through the ears 26 which openings are adjustable by means of fasteners 27 in order to permit such first member 24 to be freely, horizontally slidable along said shafts 22 for reciprocal motion between the loading and delivery stations 12, 14, respectively.

Upper and lower portions of the frame 25 are in turn adapted to receive and support a pair of horizontally spaced vertically orientated shafts 28 which are of course horizontally reciprocally movable along with the first member 24 and upon which a second member 30 is positioned for reciprocal free slidable movement in a vertical position within the confines of such first member 24. For this purpose the second member 30 may be provided with vertically orientated openings 32 for receipt of the shafts 28 or other means such as the opposed ear portions 26 held in position by fasteners 27 utilized in the case of the first member 24 to define channels for receipt of the shafts 22. The front face of the second member 30 is further provided with a plate 34 attached thereto by any suitable means (not shown) which is in turn provided with a brace or supporting element 36 for positioning a parts handling mechanism 38 of known construction including a pair of opposed part handling jaws 40 activatable from expanded part release position to a closed part grasping position by well known activation mechanisms, such as compressed air supplied thereto by means of a pair of air hoses 42 which in turn are connected to opposite sides of a mounting block assembly 44 for an air operated piston 46. From the above it should be clear that while the first member 24 is free to horizontally reciprocate back and forth along the shafts 22 with respect to the main plate 16 in an X direction; that during such action the second member 30 is also free to vertically reciprocate within the confines of the frame 25 in a Y direction and in this fashion may serve to move the parts handling mechanism 38 through a parts handling path from the loading station to the delivery station and vice versa, which path has horizontal and vertical components thereof (X-Y components). Such ability to move in a compound directional path enables the article grasping means 38 to clear the supporting surfaces necessarily forming a part of the stations 12, 14 but further to obviate any obstructions which may be horizontally in between such stations.

In order to control the composite X-Y path that the article handling mechansim 38 may take, a follower 44 is positioned rearwardly of the second member 32 so as to extend through a cam path 46 formed within the main plate 16 and in turn into operational association with motion actuating means 48. The cam path 46 depicted is of a generally inverted U-shape configuration, having terminal vertically oriented path portions 50 and a horizontal path portion 52 disposed therebetween. Although it is contemplated that the cam path 46 will include X-Y, that is vertical and horizontal components or path portions, the particular configuration may be altered accordingly and for this purpose the cam path is defined within a plate 54 which is in turn attached as by mounting bolts 56 to an overall recessed opening 58 provided within the main plate 16.

Figure 5:
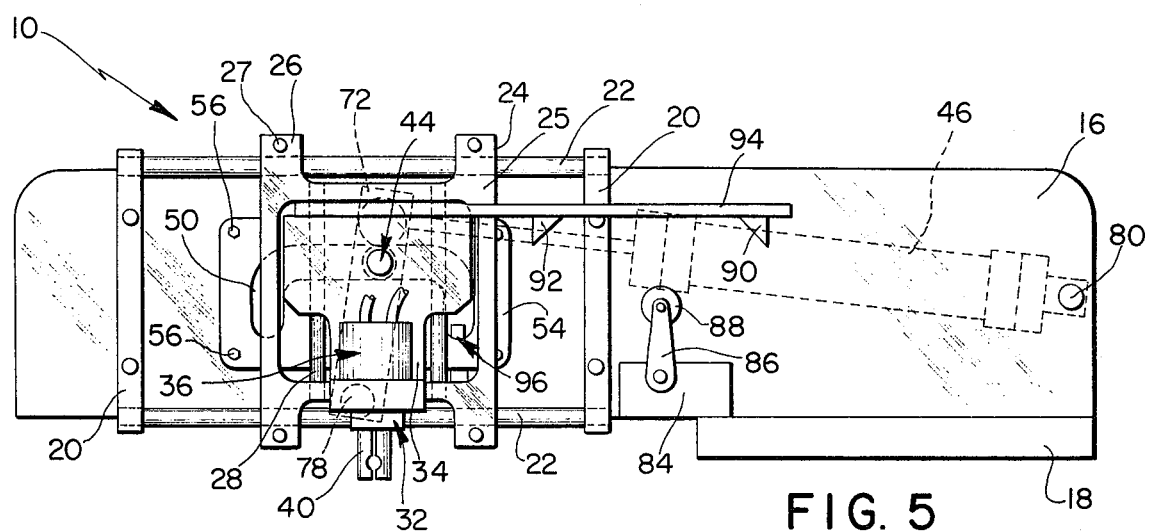
FIG. 5 is a view similar to FIG. 1, but showing the slide mechanism in a position intermediate the loading and delivery stations.
Figure 6:
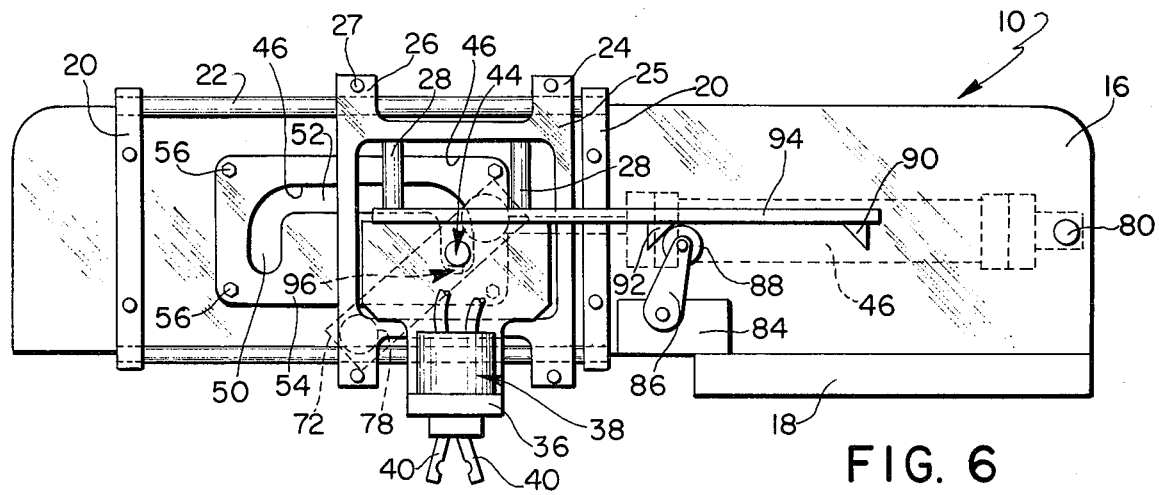
FIG. 6 is also an elevational view smilar to FIGS. 1 and 5 of the drawings, but showing the device in a terminal position at the end of its reciprocal travel, that is, in a delivery station attitute.
Figure 7:
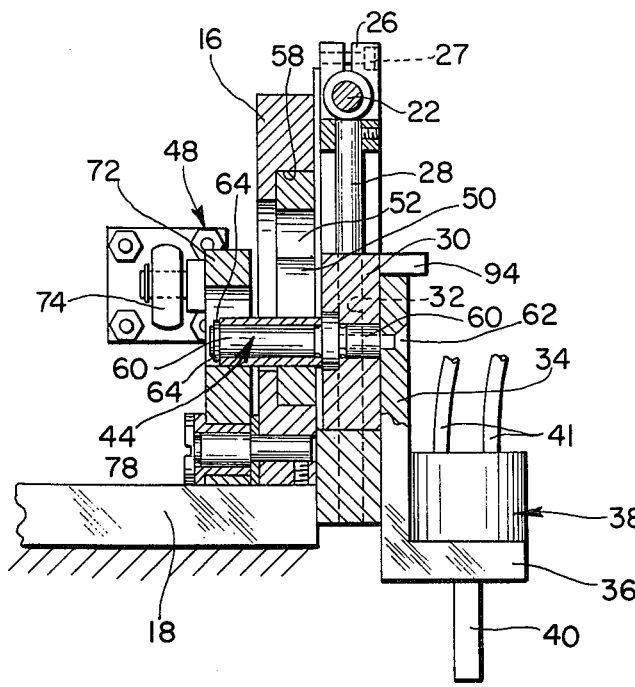
FIG. 7 is an end sectional view taken along line 7—17 of FIG. 1 and shows in particular the relationship between the various structural components of the device.

The construction of the follower 44 is best depicted by reference to FIG. 7 of the drawings, wherein such includes an internal shaft 60 which is fixedly attached to the second member 30 as through the threaded pin 62 passing through an opening provided in the face of plate 34 and the first member 30. The other surface of the shaft 60 is provided with a shell 63 of hardened steel and the like which is freely rotatable about the outside surface of the shaft 44 and which is retained from lateral movement thereon by a retaining ring 64. The follower 44 thus serves to operationally interconnect the motion actuation means 48 with the sliding members 24 and 30 and by reason of its simultaneous contact with portions of the cam path 46 serves to control the attitudes which such sliding members 24, 30 may take, as the motion actuating means 48 reciprocates them in an overall horizontal movement between the loading and delivery stations 12, 14. Also, inasmuch as the contact between the cam follower 44 and the cam surface 46 is facilitated by contacting the shell 63 which in turn is freely rotatable about the shaft 60, uneven wear on either the follower 44 or the cam surface 46 is prevented. The relative movement between sliding members 24, 30 and the main plate 16 is best illustrated by the transition between FIGS. 1, 5 and 6 of the drawings.

Figure 2:
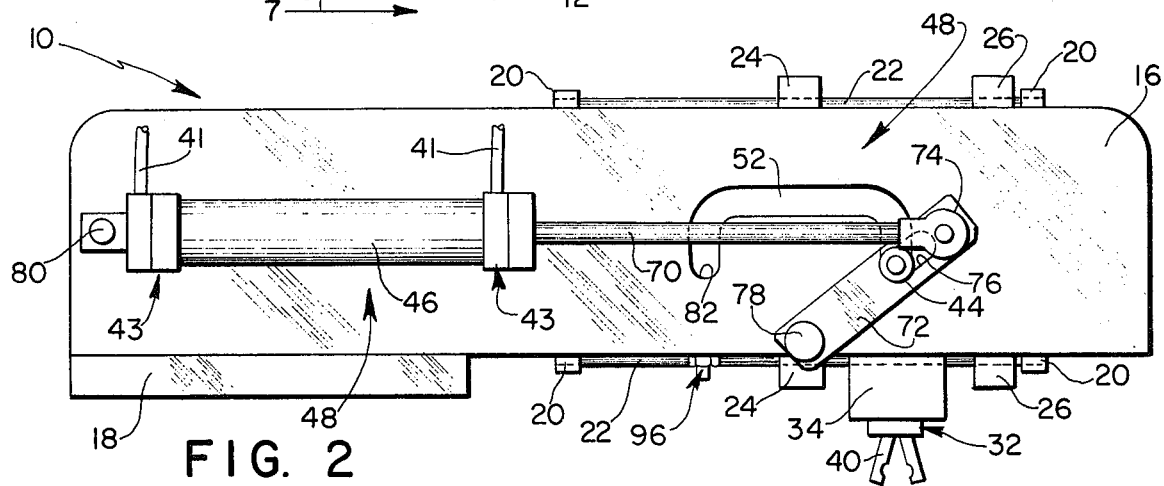
FIG. 2 is an elevational view of the device of the present invention similar to FIG. 1, but viewed from the opposite or drive side thereof.
Figure 3:
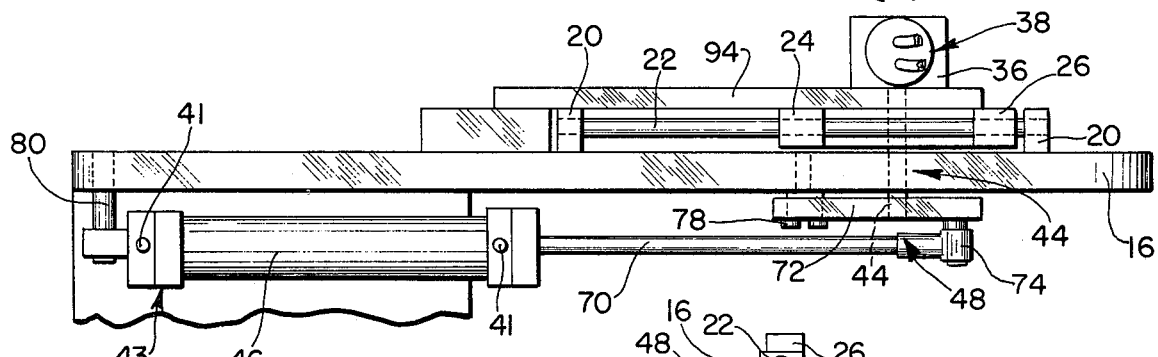
FIG. 3 is a top plan view of FIG. 2.
Figure 4:
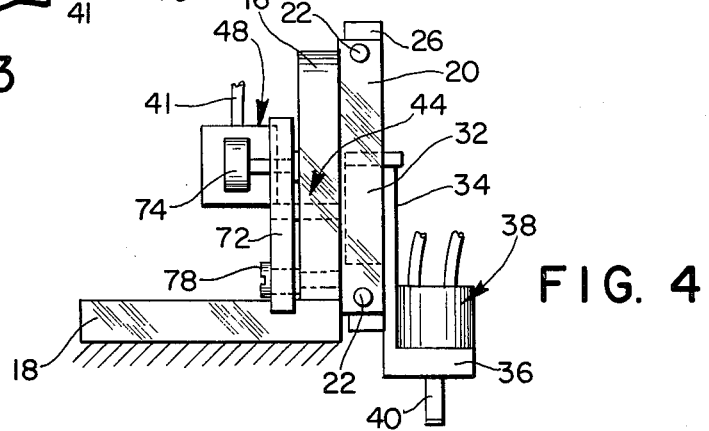
FIG. 4 is an end view thereof as viewed from the right of FIG. 3.

Turning now to FIG. 2 of the drawings particularly, the construction of the motion actuating means 48 is best shown. Such includes a cylinder 46 having a piston 70 horizontally reciprocal by means of pressurized air connectors 41 to cylinder supports 43. The air connectors 41 are in turn connected to the parts handling mechanisms 38 as is known so as to activate the jaws 40 thereof to the proper mode dependent upon its position with respect to the parts stations 12, 14. It should be also clear that other fluids other than air could constitute the operational medium and that alternatively electrical or other means could be utilized. The piston 70 is in turn connected to a crank arm 72 by known connection means 74. The crank arm 72 is in turn provided with a slot 76 to receive the rearwardly extending portion of the follower 44 and is also pivotally attached to the main plate 16 as at pivot 78. Thus, upon horizontal reciprocation of the piston 70, the crank arm 72 assumes an arcuate back and forth movement about pivot 78. In order to facilitate such arcuate movement of the crank arm 72, the cylinder 46 is further pivotally connected as at 80 to the main plate 16. Also, inasmuch as the follower 44 is free to move back and forth within the slot 76, such arcuate reciprocal movement of the crank arm 72 is translated to the follower 44 in a motion that is controlled by its simultaneous contact with the cam path 46. Thus, as the crank 72 moves arcuately to the left as shown in FIG. 2 of the drawings, the follower 44 will initially assume a vertical path along one of the terminal vertical path portions 50 of the cam path 46 until its intersection with the horizontal path portion 52 whereupon it will assume a horizontal motion, and thereafter a final vertical downward motion until abutting with the terminus 82 thereof. On the reverse stroke of the crank arm 72, a motion opposite to that above-described is translated to the follower 44. Thus, the motion that the follower 44 assumes during reciprocal movement of the crank arm 72 is translated initially to the second member 30 by means of its rigid connection therewith so that the second slide member 30 initially moves vertically upward within the confines of the first slidable member 24 and thereafter is moved horizontally along the cam path 52 which simultaneously forces the first slidable member horizontally on the shaft 22 until the follower 44 reaches the intersection between such horizontal path portion 52 and the remaining vertical path portion 50 whereupon the horizontal motion transmitted to the first member 24 is completed and the second slidable member moves vertically downward until its abutment with the terminus 82. Coordinated with such movement so that the appropriate actuation attitudes of the parts handling mechanism 38 may be assumed at the appropriate positioning with respect to the delivery and loading stations 12, 14, is a switch 84. Such switch is pivotally mounted on the main frame 16 and includes an arm 86 supporting a roller member 88 for contact with a switch actuating member 90 having a front face 92 assuming a generally 45° angle with respect to the roller 88 and in this way as the switch member 90 moves vertically downward upon the switch 84. Such surface 92 is free to alternately, depending on its disposition, move the switch to the left or to the right so as to appropriately actuate as by air pressure the jaws 40 of the part handling mechanism 38 into the correct mode. Two such switch actuating members 90 are mounted in adjustable horizontally separated positions along an actuator bar 94 which in turn is appropriately fixedly mounted to the second slidable member 30 either directly or by attachment to the plate 34.

In many cases it is necessary or desirable to be able to modify to a slight extent the final positioning of the part handling mechanism 38 with respect to either the loading or delivery stations 12, 14, without the necessity of modifying, that is, substituting the particular cam path 46 positioned within the device 10. In order to accommodate such action a further novel construction of the present invention as incorporated in the form of an adjustment means 96 to vary the length of one or both of the vertical path portions 50 and may take the form of a housing 98 attached to the main frame 16 and in turn provided with an internally threaded bore for receipt of a screw member 100. The screw 100 is positoned at the terminus 82 of the vertical path portion 50 and is upwardly movable with respect thereto so as to upwardly shift in effect the terminus 82 by causing abutment of the follower 44 with such screw member 100.

It is accordingly believed that a novel pick and place machine is disclosed herein of straight forward construction and which permits arcuate reciprocal motion transmitted from a reciprocating piston to be transmitted to a cam follower which will in turns assume the motion of a cam path which in turn transmits such cam path motion to a pair of cooperating, slide members in a manner which enables more extensive and convenient adjustment. The terms horizontally and vertically as used throughout the above description and the following claims are relative terms to describe the general attitudes of the various parts with respect to each other rather than limiting terms delineating exact directions, it being clear of course that the device 10 of the present invention could assume various positional attitudes.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pick and place machine operable to pick up a part at a loading station and thereafter to place and release the part in a delivery station spaced at least horizontally from said loading station comprising, a housing, a first member supported by said housing for free horizontal reciprocal movement with respect thereto between said stations, a second member supported by said first member for free vertical reciprocal movement with respect thereto, said second member having at least portions thereof in horizontal abutment with said first member, guide means including a track having horizontal and vertical components and a follower disposed thereon, said follower connected to said second member, means for reciprocating said follower along said track whereby vertical movement thereof actuates said second member with respect to first member and horizontal movement thereof simultaneously horizontally moves both said members, said second member including part holding means thereon, and actuation means for operating said part holding means to respectively grasp and release said part in said loading and delivery stations in response to the movement of said second member.

2. The machine of claim 1, both said first and second members being respectively slide-mounted on spaced horizontally and vertically disposed posts in turn respectively supported by said housing and said first member.

3. The machine of claim 2, wherein said second member is freely vertically slidable along a pair of horizontally spaced posts vertically disposed within said first member and stationary with respect thereto, and wherein horizontal movement of said second member in turn forces said first member along said horizontally disposed housing supported posts.

4. The machine of claim 1, wherein said track means includes a vertically orientated plate disposed laterally between said members and said follower actuation means, said plate having an open cam track defined therein.

5. The machine of claim 4, said follower actuation means comprising a pivotally mounted crank arm arcuately movable between opposed horizontally spaced positions in response to said actuation means, said follower laterally extending from said second member through said cam track opening and into operative association with a slot in said crank arm so that said arcuate movement of said crank arm forces said follower along said cam path.

6. The machine of claim 5, said cam path generally being in the form of an inverted U-shape having initial and terminal vertical path portions interconnected by a horizontal path portion.

7. The machine of claim 6, said actuation means including a pair of spaced flags mounted on a bar horizontally extending from and connected to said second member and movable therewith, said flags adapted to contact a limit switch disposed on said housing.

8. The machine of claim 7, said flags having an upwardly inwardly directed surface adapted for contact with an upstanding portion of said limit switch to throw such switch horizontally in either direction from a part holding intermediate position, said flags further being horizontally adjustable with respect to said bar so as to vary the vertical disposition of said contacting surface so as to in turn vary the vertical level of said second member within said vertical path portions of said cam path.

9. The machine of claim 5, said follower including a cylindrical shaft fixedly attached to said second member and a cylindrical shell concentrically disposed on and supported by said shaft for free rotation thereon, said shell retained from substantially lateral movement with respect to said shaft and adapted for low friction rolling contact with said cam track and said crank arm slot.

10. The machine of claim 1, said housing including a main plate having an open cam track therein, first means extending forwardly of said plate, said first means being horizontally disposed and fixed in position relative to said housing, a first member adapted for free reciprocal horizontal slide movement on said first means, second means vertically disposed between upper and lower portions of said first member and fixed in position with respect to said first member, a second member adapted for reciprocal vertical slide movement on said second means, a crank arm pivotally mounted on said main plate and extending rearwardly thereof, a follower operatively associated with said crank arm and passing through said cam track and connected to said second member whereby movement of said crank arm forces said follower along said cam path so as to in turn cause said second member to track said cam path and said first member by action of said second member thereon to move between the horizontal limits thereof.

11. The machine of claim 10, said first and second means being pairs of spaced rods upon which said first and second members are free to slide.

12. The machine of claim 11, said cam path being generally of an inverted U-shape and said crank arm having an elongated slot adapted for receipt of said follower for actuation movement thereof by coaction with the edges of said slot.

13. The machine of claim 1, said part holding means positioned with operative respect to said parts for respective hold and release functions thereof when said follower contacts the terminal points of said vertical path components and means for adjusting the said terminal points of said vertical path components.

14. The machine of claim 13, said track being a cam path of an inverted U-shape having initial and terminal vertical path portions interconnected by horizontal path portion, said vertical paths each terminating in a stop for said follower, at least one of said stops being vertically adjustable to vary the travel of said follower and accordingly the position of said part holding means at least at one of said stations.

15. The machine of claim 14, said stop including a vertically adjustable screw received in said guide means at the terminus of at least one of said vertical paths.

* * * * *